(12) United States Patent
Lindhé

(10) Patent No.: US 11,612,286 B2
(45) Date of Patent: Mar. 28, 2023

(54) USING AUGMENTED REALITY TO EXCHANGE SPATIAL INFORMATION WITH A ROBOTIC CLEANING DEVICE

(71) Applicant: Aktiebolaget Electrolux, Stockholm (SE)

(72) Inventor: Magnus Lindhé, Stockholm (SE)

(73) Assignee: Aktiebolaget Electrolux

( * ) Notice: Subject to any disclaimer, the term of this patent is extended or adjusted under 35 U.S.C. 154(b) by 352 days.

(21) Appl. No.: 16/758,243

(22) PCT Filed: Oct. 26, 2017

(86) PCT No.: PCT/EP2017/077493
§ 371 (c)(1),
(2) Date: Apr. 22, 2020

(87) PCT Pub. No.: WO2019/081030
PCT Pub. Date: May 2, 2019

(65) Prior Publication Data
US 2020/0268226 A1    Aug. 27, 2020

(51) Int. Cl.
*B25J 9/16* (2006.01)
*A47L 9/00* (2006.01)
(Continued)

(52) U.S. Cl.
CPC .............. *A47L 9/009* (2013.01); *A47L 9/2894* (2013.01); *G05D 1/0016* (2013.01);
(Continued)

(58) Field of Classification Search
CPC ... G05D 2201/0203; G05D 2201/0215; G05D 1/0016; G05D 1/0214; G05D 1/0212;
(Continued)

(56) References Cited

U.S. PATENT DOCUMENTS 9,950,429 B2    4/2018 Kim et al.
10,569,420 B1 *  2/2020 Cohen .................. B25J 13/084
(Continued)

FOREIGN PATENT DOCUMENTS

KR    1020140053764 A    5/2014
KR      101575597 B1   12/2015

OTHER PUBLICATIONS

Korean Notification of Reason for Refusal for Korean Application No. 10-2020-7013849, dated Sep. 14, 2021 with translation, 23 pages.
(Continued)

*Primary Examiner* — Dalena Tran
(74) *Attorney, Agent, or Firm* — RatnerPrestia

(57) ABSTRACT

A method of controlling movement of a robotic cleaning device over an area to be cleaned. The method includes acquiring a visual representation of the robotic cleaning device on a display of a wireless communication device, identifying the robotic cleaning device in the visual representation, computing a coordinate transform between the visual representation and a robotic cleaning device coordinate system, creating an instruction by receiving user-indicated spatial information on the display or how the robotic cleaning device should move over the area to be cleaned, applying the transform to the spatial information, transforming the spatial information to the robot coordinate system, and sending the instruction to the robotic cleaning device via wireless communication, to cause the robotic cleaning device to move over said area in accordance with the transformed spatial information.

16 Claims, 9 Drawing Sheets

(51) Int. Cl.
*A47L 9/28* (2006.01)
*G05D 1/00* (2006.01)
*A47L 9/04* (2006.01)

(52) U.S. Cl.
CPC .............. *G05D 1/0033* (2013.01); *A47L 9/04* (2013.01); *A47L 2201/04* (2013.01)

(58) Field of Classification Search
CPC . G05D 1/0011; A47L 9/2857; A47L 2201/04; A47L 2201/06; B25J 9/1676; B25J 9/1661; B25J 9/1664; B25J 11/0085
USPC ........ 15/319, 340.1; 382/153; 700/245, 258, 700/257
See application file for complete search history.

(56) References Cited

U.S. PATENT DOCUMENTS

| | | | |
|---|---|---|---|
| 2016/0052133 A1* | 2/2016 | Kim | A47L 9/2852 901/1 |
| 2017/0079497 A1* | 3/2017 | Kim | G05D 1/0033 |
| 2020/0001475 A1* | 1/2020 | Dooley | B25J 19/023 |

OTHER PUBLICATIONS

Japanese Notice of Reasons for Refusal for Japanese Application No. 2020-515149, dated Feb. 25, 2021, 4 pages.
European Communication for EP Application No. 17801353.8, dated Apr. 7, 2022, 6 pages.

\* cited by examiner

USING AUGMENTED REALITY TO EXCHANGE SPATIAL INFORMATION WITH A ROBOTIC CLEANING DEVICE

This application is a U.S. National Phase application of PCT International Application No. PCT/EP2017/077493, filed Oct. 26, 2017, which is incorporated by reference herein.

TECHNICAL FIELD

The invention relates to a method of controlling movement of a robotic cleaning device over an area to be cleaned and a device performing the method. The invention further relates to a method of acquiring spatial information of a robotic cleaning device and a device performing the method.

BACKGROUND

In many fields of technology, it is desirable to use robots with an autonomous behaviour such that they freely can move around a space without colliding with possible obstacles.

Robotic vacuum cleaners are known in the art, which are equipped with drive means in the form of a motor for moving the cleaner across a surface to be cleaned. The robotic vacuum cleaners are further equipped with intelligence in the form of microprocessor(s) and navigation means for causing an autonomous behaviour such that the robotic vacuum cleaners freely can move around and clean a surface in the form of e.g. a floor. Thus, these prior art robotic vacuum cleaners have the capability of autonomously vacuum clean a room in which objects such as tables and chairs and other obstacles such as walls and stairs are located.

There are a variety of methods for sending commands to or receiving data from a robotic vacuum cleaner, but for methods relating to the environment of the cleaner, it is difficult to establish a common reference. The most common way of commanding the cleaner is to have the robotic vacuum cleaner draw a map and let the user add information to the map. However, such a map may suffer from any mapping errors that the robotic vacuum cleaner has experienced during that process. Also, if the map is small or spares with details, it is difficult for an inexperienced user to identify objects in the map.

SUMMARY

An object of the present invention is to solve, or at least mitigate, this problem in the art and thus to provided an improved method of controlling movement of a robotic cleaning device over an area to be cleaned.

This object is attained in a first aspect of the invention by a method of controlling movement of a robotic cleaning device over an area to be cleaned. The method comprises acquiring a visual representation of the robotic cleaning device on a display of a wireless communication device, identifying the robotic cleaning device in the visual representation, computing coordinate transform between the visual representation and robotic cleaning device coordinate system, creating an instruction by allowing a user to indicate on said display spatial information on how the robotic cleaning device should move over the area to be cleaned, apply the computed transform to the spatial information of the instruction, wherein the spatial information of the instruction is transformed to the robot coordinate system, and sending the instruction to the robotic cleaning device via wireless communication, wherein the robotic cleaning device moves over said area in accordance with the transformed spatial information of the instruction.

This object is attained in a second aspect of the invention by a wireless communication device configured to control movement of a robotic cleaning device over an area to be cleaned. The wireless communication device comprises a processing unit being configured to cause the wireless communication device to be operative to acquire a visual representation of the robotic cleaning device on a display of a wireless communication device, identify the robotic cleaning device in the visual representation, compute coordinate transform between the visual representation and robotic cleaning device coordinate system, create an instruction by allowing a user to indicate on said display spatial information on how the robotic cleaning device should move over the area to be cleaned, apply the computed transform to the spatial information of the instruction, wherein the spatial information of the instruction is transformed to the robot coordinate system, and send the instruction to the robotic cleaning device via wireless communication, wherein the robotic cleaning device moves over said area in accordance with the transformed spatial information of the instruction.

This object is attained in a third aspect of the invention by a method of acquiring spatial information of a robotic cleaning device. The method comprises acquiring a visual representation of the robotic cleaning device on a display of a wireless communication device, identifying the robotic cleaning device in the visual representation, computing coordinate transform between the visual representation and robotic cleaning device coordinate system, receive spatial information from the robotic cleaning device via wireless communication, applying the computed transform to the received spatial information, wherein the received spatial information is transformed to the coordinate system of the visual representation, and presenting the transformed spatial information in the acquired visual representation on the display of the wireless communication devices.

This object is attained in a fourth aspect of the invention by a wireless communication device configured to acquire spatial information of a robotic cleaning device. The wireless communication device comprises a processing unit being configured to cause the wireless communication device to be operative to acquire a visual representation of the robotic cleaning device on a display of a wireless communication device, identify the robotic cleaning device in the visual representation, compute coordinate transform between the visual representation and robotic cleaning device coordinate system, receive spatial information from the robotic cleaning device via wireless communication, apply the computed transform to the received spatial information, wherein the received spatial information is transformed to the coordinate system of the visual representation, and present the transformed spatial information in the acquired visual representation on the display of the wireless communication device.

Hence, in an embodiment, a user acquires a visual representation of the robotic cleaning device on a display of a wireless communication device in the form of e.g. a smart phone, a tablet, a laptop, etc.

For instance, the user simply captures an image of the robotic cleaning device using for instance a camera of her smart phone.

The smart phone identifies the shape of the robotic cleaning device in the image, e.g. by comparing it to a pre-programmed representation of the robotic cleaning device. This representation may also contain an actual size of the robotic cleaning device. Alternatively, the identification of the robotic cleaning device in the image, could be based on, or assisted by, a known pattern or marker on the body of the robotic device.

Thereafter, the smart phone computes the coordinate transform between a coordinate system of the image and a coordinate system of the robotic device. As a result, the coordinates of the coordinate system in which the robotic device moves can be translated to the coordinates of the image coordinate system.

The user creates an instruction by indicating on the display of her smart phone spatial information on how the robotic cleaning device should move over the area to be cleaned. It is noted that this may require an application (in the following referred to as an "App") installed on the smart phone, via which App the user simply uses her finger to touch the display in order to indicate the area to be cleaned.

In this example, the user may wish the robotic cleaning device to execute a so called spot cleaning program around e.g. a table, where crumbs and food scraps commonly end up. The user may for instance draw a rectangle on the display of the smart phone encompassing the area to be cleaned.

Finally, the user presses "send instruction" on the App, whereupon the smart phone applies the previously computed transform to the image coordinates of the area to be cleaned (in practice rectangle corner points encompassing the area) to the coordinate system of the robotic cleaning device, and then sends them to the robotic cleaning device via wireless communication (for instance via WiFi).

The robotic cleaning device will thus advantageously perform the spot cleaning program by moving over, and cleaning, the indicated area in accordance with the transformed spatial information of the received instruction.

Conversely, in another embodiment, spatial information is communicated from the robotic cleaning device to the user via the display of her wireless communication device.

For instance, it may be envisaged that the robotic cleaning device perceives a carpet as an obstacle that should not be approached or traversed, wherein the user is given an opportunity to communicate to the robotic cleaning device that it indeed may traverse the carpet without the risk of getting stuck.

Again, the user captures an image of the robotic cleaning device using for instance a camera of her smart phone, followed by the smart phone identifying the robotic cleaning device in the image.

Thereafter, the smart phone computes the coordinate transform between a coordinate system of the image and a coordinate system of the robotic device. As a result, the coordinates of the coordinate system in which the robotic device moves can be translated to the coordinates of the image coordinate system.

The smart phone receives spatial information from the robotic cleaning device via wireless communication, and applies the computed transform to the received spatial information, wherein the received spatial information of the robotic cleaning device is transformed to the coordinate system of the image.

Finally, the transformed spatial information is presented in the captured image on the display of the smart phone. As previously mentioned, the robotic cleaning device may for instance advantageously add the contour of the carpet to the image, indicating that it perceives the carpet as a non-traversable obstacle which the user may given a chance to correct.

In another embodiment, the robotic cleaning device communicates a proposal of an area to be cleaned to the smart phone.

Hence, spatial information is received from the robotic cleaning device, in this particular exemplifying embodiment in the form of a proposed area to be cleaned, which after having been transformed is presented in the captured image on the display of the wireless communication device for the review of the user.

The user can either confirm that the proposed area indeed is the area to be cleaned and send the confirmation as an instruction accordingly, or modify the proposed area, for instance by moving corner points of a rectangle encompassing the proposed area, as shown on the display, in desired directions. It could further be envisaged that the user can add further corner points to the representation on the display by touching and pressing a line, whereby a new corner point will occur at a position where the line is pressed.

Thereafter, the previously computed transform is applied to the modified proposed area to be cleaned, wherein the modified proposed area is transformed to the coordinate system of the robotic cleaning device.

Finally, the smart phone sends an instruction to the robotic cleaning device to clean the modified area, the instruction also comprising the information identifying the transformed modified proposed area. Hence, the robotic cleaning device may have proposed a rectangular-shaped area to be cleaned, which the user modified into e.g. a pentagonal-shaped area that the robotic cleaning device is instructed to clean instead.

In an alternative embodiment, a device different from the smart phone is controlled to capture an image of the robotic cleaning device, such as for instance a surveillance camera. In such an embodiment, the user can advantageously control the robotic cleaning device from a remote location.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

The invention relates to robotic cleaning devices, or in other words, to automatic, self-propelled machines for cleaning a surface, e.g. a robotic vacuum cleaner, a robotic sweeper or a robotic floor washer. The robotic cleaning device according to the invention can be mains-operated and have a cord, be battery-operated or use any other kind of suitable energy source, for example solar energy.

Figure 1:
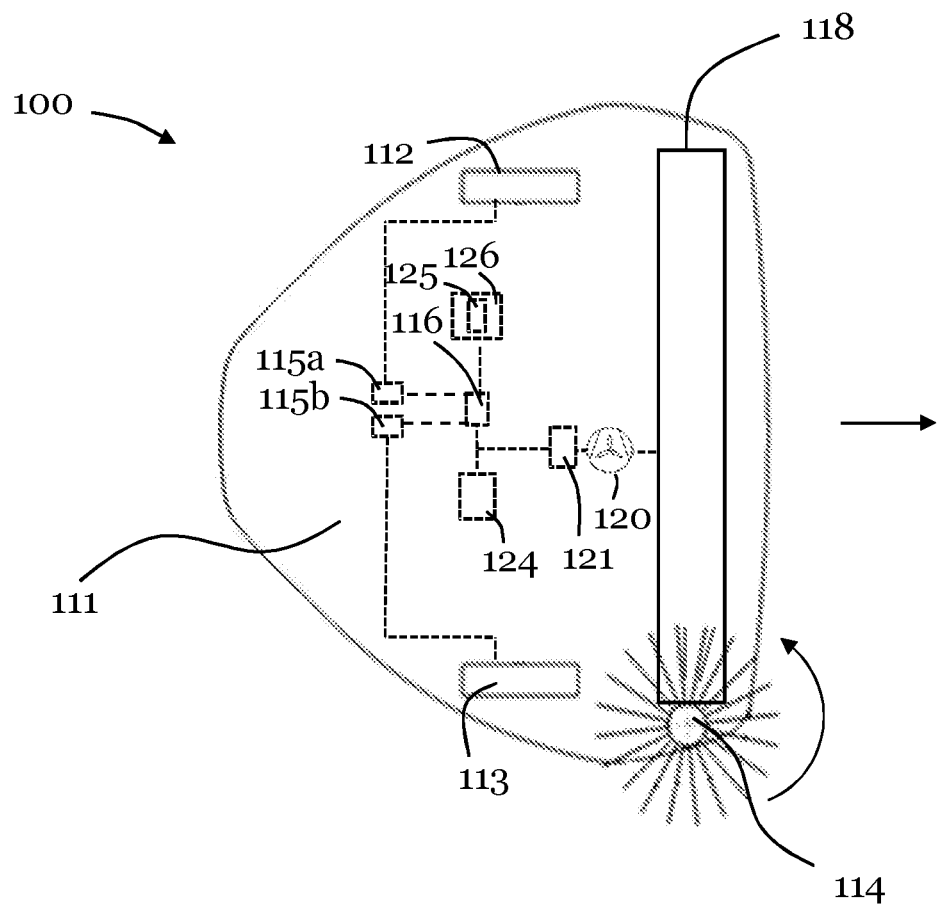
FIG. 1 shows a robotic cleaning device according to an exemplifying embodiment of the present invention.

Even though it is envisaged that the invention may be performed by a variety of appropriate robotic cleaning devices being equipped with sufficient processing intelligence, FIG. 1 shows a robotic cleaning device 100 according to an embodiment of the present invention in a bottom view, i.e. the bottom side of the robotic cleaning device is shown. The arrow indicates the forward direction of the robotic cleaning device 100 being illustrated in the form of a robotic vacuum cleaner.

The robotic cleaning device 100 comprises a main body 111 housing components such as a propulsion system comprising driving means in the form of two electric wheel motors 115a, 115b for enabling movement of the driving wheels 112, 113 such that the cleaning device can be moved over a surface to be cleaned. Each wheel motor 115a, 115b is capable of controlling the respective driving wheel 112, 113 to rotate independently of each other in order to move the robotic cleaning device 100 across the surface to be cleaned. A number of different driving wheel arrangements, as well as various wheel motor arrangements, can be envisaged. It should be noted that the robotic cleaning device may have any appropriate shape, such as a device having a more traditional circular-shaped main body, or a triangular-shaped main body. As an alternative, a track propulsion system may be used or even a hovercraft propulsion system. The propulsion system may further be arranged to cause the robotic cleaning device 100 to perform any one or more of a yaw, pitch, translation or roll movement.

A controller 116 such as a microprocessor controls the wheel motors 115a, 115b to rotate the driving wheels 112, 113 as required in view of information received from an obstacle detecting device (not shown in FIG. 1) for detecting obstacles in the form of walls, floor lamps, table legs, around which the robotic cleaning device must navigate. The obstacle detecting device may be embodied in the form of a 3D sensor system registering its surroundings, implemented by means of e.g. a 3D camera, a camera in combination with lasers, a laser scanner, etc. for detecting obstacles and communicating information about any detected obstacle to the microprocessor 116. The microprocessor 116 communicates with the wheel motors 115a, 115b to control movement of the wheels 112, 113 in accordance with information provided by the obstacle detecting device such that the robotic cleaning device 100 can move as desired across the surface to be cleaned.

Moreover, the main body 111 of the robotic cleaner 100 comprises a suction fan 120 creating an air flow for transporting debris to a dust bag or cyclone arrangement (not shown) housed in the main body via the opening 118 in the bottom side of the main body 111. The suction fan 120 is driven by a fan motor 121 communicatively connected to the controller 116 from which the fan motor 121 receives instructions for controlling the suction fan 120. The main body 111 may further be arranged with one or more rotating side brushes 114 adjacent to the opening 118.

With further reference to FIG. 1, the controller/processing unit 116 embodied in the form of one or more microprocessors is arranged to execute a computer program 125 downloaded to a suitable storage medium 126 associated with the microprocessor, such as a Random Access Memory (RAM), a Flash memory or a hard disk drive. The controller 116 is arranged to carry out a method according to embodiments of the present invention when the appropriate computer program 125 comprising computer-executable instructions is downloaded to the storage medium 126 and executed by the controller 116. The storage medium 126 may also be a computer program product comprising the computer program 125. Alternatively, the computer program 125 may be transferred to the storage medium 126 by means of a suitable computer program product, such as a digital versatile disc (DVD), compact disc (CD) or a memory stick. As a further alternative, the computer program 125 may be downloaded to the storage medium 126 over a wired or wireless network. The controller 116 may alternatively be embodied in the form of a digital signal processor (DSP), an application specific integrated circuit (ASIC), a field-programmable gate array (FPGA), a complex programmable logic device (CPLD), etc.

Figure 2:
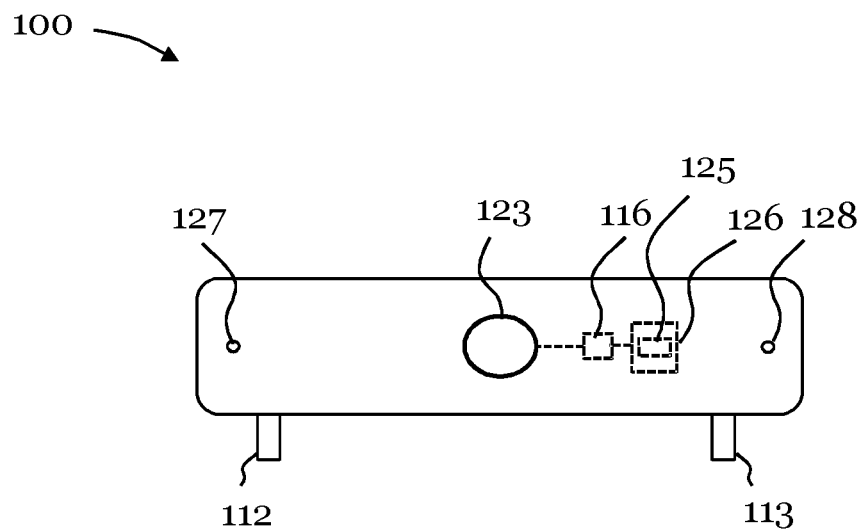
FIG. 2 shows the robotic cleaning device of FIG. 1 in a front view.

FIG. 2 shows a front view of the robotic cleaning device 100 of FIG. 1 in an embodiment of the present invention illustrating the previously mentioned obstacle detecting device in the form of a 3D sensor system comprising at least a camera 123 and a first and a second line laser 127, 128, which may be horizontally or vertically oriented line lasers. Further shown is the controller 116, the main body 111, and the driving wheels 112, 113. The controller 116 is operatively coupled to the camera 123 for recording images of a vicinity of the robotic cleaning device 100. The first and second line lasers 127, 128 may preferably be vertical line lasers and are arranged lateral of the camera 123. The camera 123 is controlled by the controller 116 to capture and record a plurality of images per second. Data from the images is extracted by the controller 116 and the data is typically saved in the memory 126 along with the computer program 125.

The first and second line laser 127, 128 are configured to scan, preferably in a vertical orientation, the vicinity of the robotic cleaning device 100, normally in the direction of movement of the robotic cleaning device 100. The first and second line lasers 127, 128 are configured to send out laser beams, which illuminate furniture, walls and other objects of e.g. a room to be cleaned. The camera 123 is controlled by the controller 116 to capture and record images from which the controller 116 creates a representation or layout of the surroundings that the robotic cleaning device 100 is operating in, by extracting features from the images and by measuring the distance covered by the robotic cleaning device 100, while the robotic cleaning device 100 is moving across the surface to be cleaned. Thus, the controller 116 derives positional data of the robotic cleaning device 100 with respect to the surface to be cleaned from the recorded images, generates a 3D representation of the surroundings from the derived positional data and controls the driving motors 115a, 115b to move the robotic cleaning device across the surface to be cleaned in accordance with the generated 3D representation and navigation information supplied to the robotic cleaning device 100 such that the surface to be cleaned can be navigated by taking into account the generated 3D representation. Alternatively, it would be possible to use 3D sensors utilizing time of flight measurements of an image being completely illuminated. With such a time of flight 3D sensor, the distance in a captured image would be determined for each pixel and distances to detected objects may be determined in line with the above.

Figure 3:
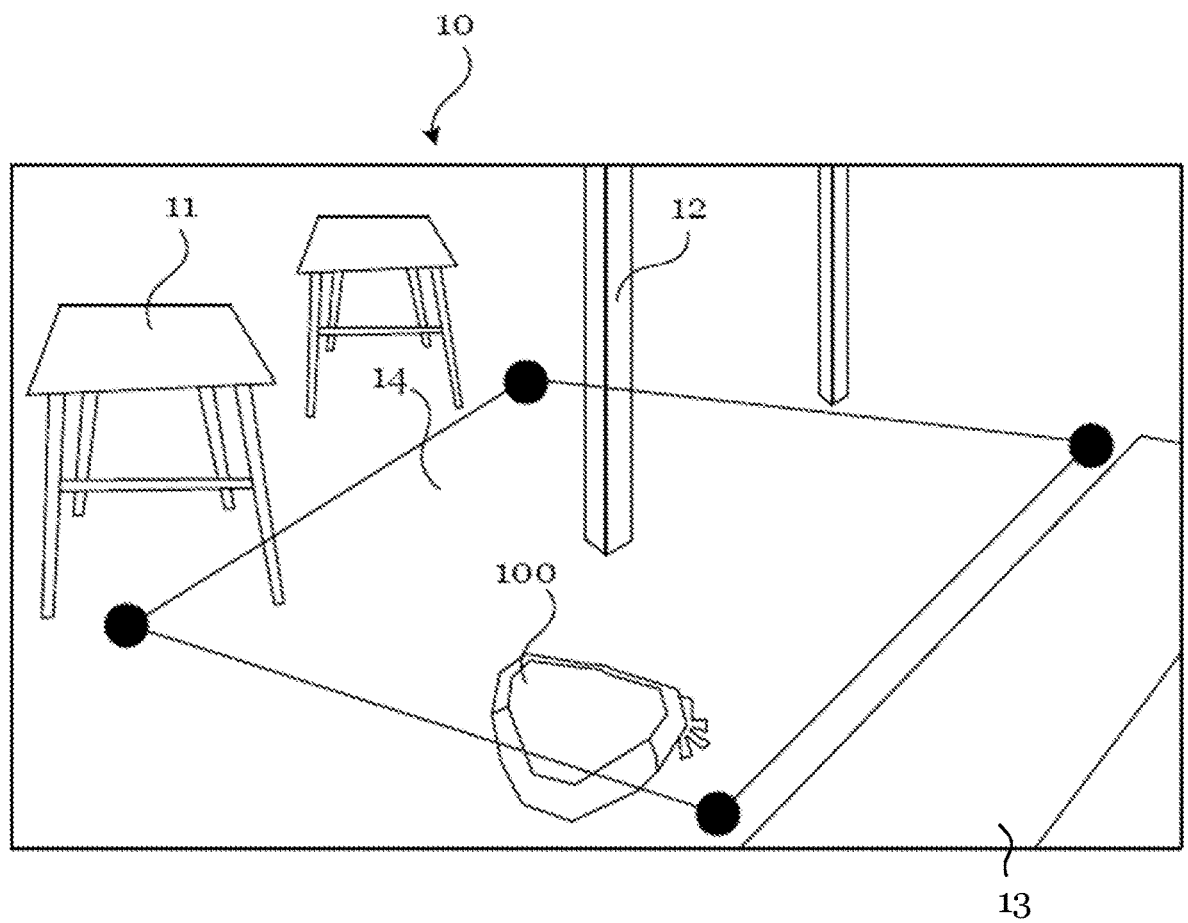
FIG. 3 shows an image taken of a robotic cleaning device with user cleaning instructions added to the image according to an embodiment.
Figure 4:
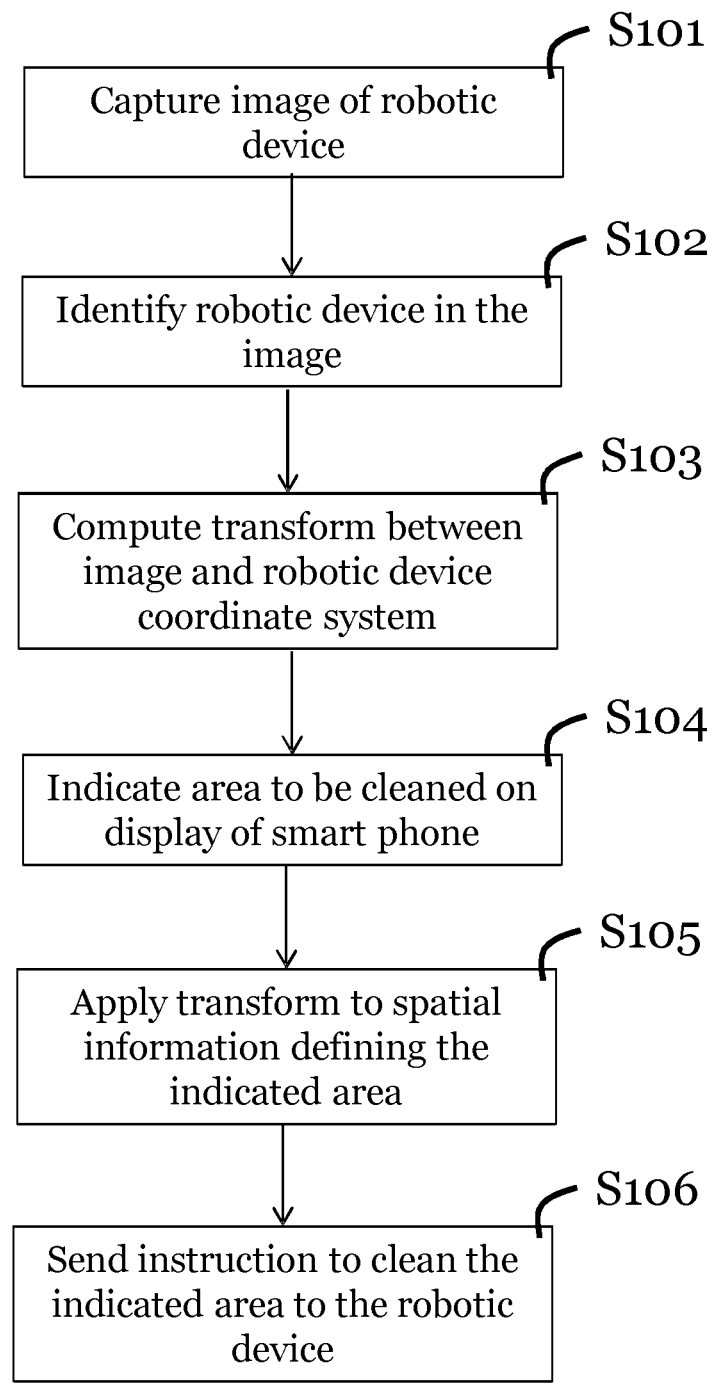
FIG. 4 shows a flowchart of a method according to an embodiment.

FIG. 3 illustrates an image taken of a robotic cleaning device 100 which together with a flowchart of FIG. 4 will be used for describing a method of controlling movement of a robotic cleaning robotic cleaning device over an area to be cleaned according to an embodiment.

In the following, spatial information refers to information associated with specific positions relative to the robot cleaning device 100, such as positions of the robotic device or specific position of objects in the vicinity of the robotic device.

In a first step S101, a user acquires a visual representation 10 of the robotic cleaning device 100 on a display of a wireless communication device in the form of e.g. a smart phone, a tablet, a laptop, etc.

In this particular exemplifying embodiment, the user simply captures an image of the robotic cleaning device 100 using for instance a camera of her smart phone.

In an alternative embodiment, a device different from the smart phone is controlled to capture an image of the robotic cleaning device 100, such as for instance a surveillance camera. In such an embodiment, the user can advantageously control the robotic cleaning device 100 from a remote location.

As can be seen in FIG. 3, the photo/visual representation 10 comprises, e.g., the robotic cleaning device 100, chairs 11, a table 12, a carpet 13, etc.

In a second step S102, the smart phone identifies the shape of the robotic cleaning device 100 in the image, e.g. by comparing it to a pre-programmed representation of the robotic cleaning device. This representation may also contain an actual size of the robotic cleaning device. Alternatively, the identification of the robotic cleaning device 100 in the image, could be based on, or assisted by, a known pattern or marker on the body of the robotic device.

Thereafter, in step S103, the smart phone computes the coordinate transform between a coordinate system of the image and a coordinate system of the robotic device 100. As a result, the coordinates of the coordinate system in which the robotic device moves can be translated to the coordinates of the image coordinate system. The transform can be computed using a standard model for projective geometry, such as a pin-hole camera model or a more advanced model that also accounts for radial lens distortion.

In step S103, the user creates an instruction by indicating on the display of her smart phone spatial information on how the robotic cleaning device 100 should move over the area to be cleaned. It is noted that this may require an App installed on the smart phone, via which App the user simply uses her finger to touch the display in order to indicate the area to be cleaned. Other means are envisaged for indicating the area to be cleaned on the display, such as a stylus, a mouse in case a computer is used, voice or gesture control, etc.

In this example, the user wishes the robotic cleaning device 100 to execute a so called spot cleaning program around the table 12, where crumbs and food scraps commonly end up. The user thus draws a rectangle on the display of the smart phone encompassing the area 14 to be cleaned.

Finally, the user presses "send instruction" on the App, whereupon the smart phone applies the previously computed transform to the image coordinates of the area to be cleaned (in practice rectangle corner points encompassing the area) to the coordinate system of the robotic cleaning device 100 in step S104, and then sends them to the robotic cleaning device 100 via wireless communication (for instance via WiFi) in step S105.

The robotic cleaning device 100 will thus perform the spot cleaning program by moving over, and cleaning, the indicated area 14 in accordance with the transformed spatial information of the received instruction.

It is noted that even though the illustrated image 10 is a real image, it may be envisaged that a synthetic image or representation is used. The image could also be partly synthetic, for example by replacing the image of the robotic cleaning device by a computer-generated image of the robot in the same orientation, to indicate to the user that the robot has been correctly identified in the image.

Figure 5:
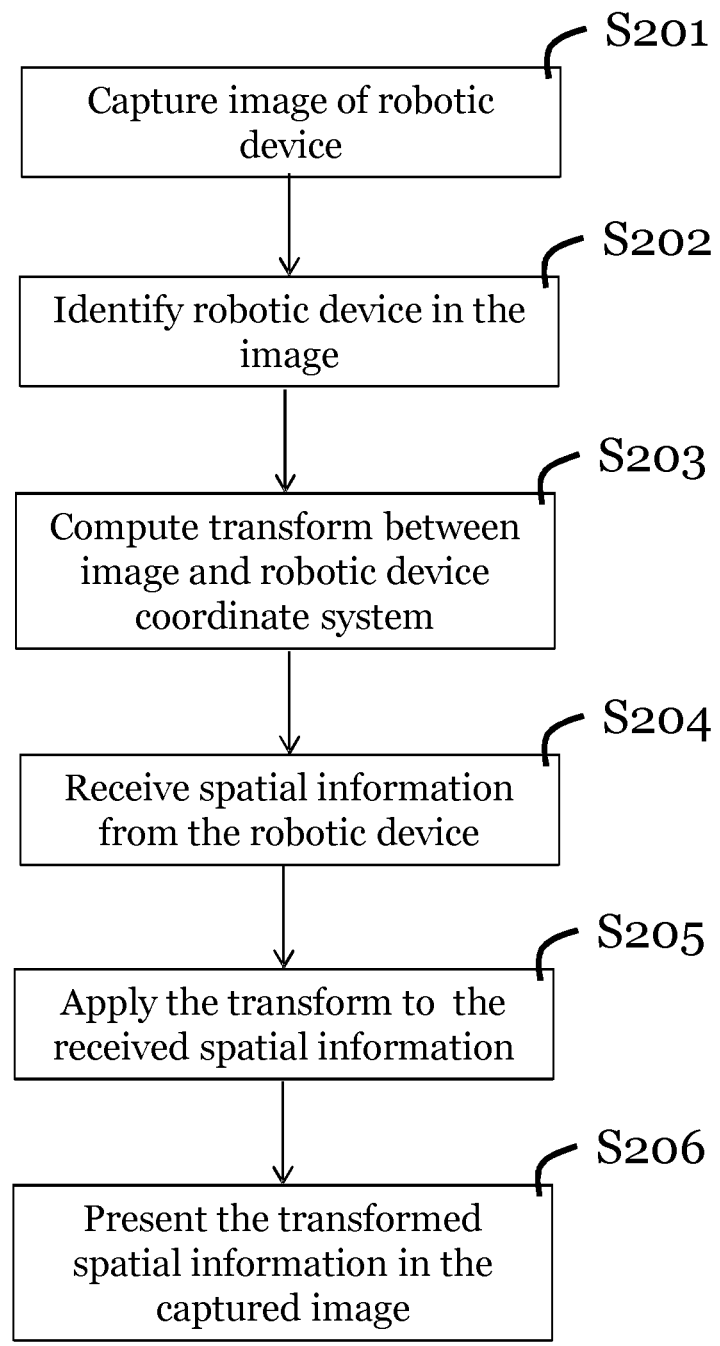
FIG. 5 shows a flowchart of a method according to another embodiment.

Conversely, with reference to FIG. 5, a flowchart is illustrated describing a method of communicating spatial information from the robotic cleaning device 100 to the user via the display of her wireless communication device according to an embodiment.

For instance, it may be envisaged that the robotic cleaning device 100 perceives the carpet 13 of FIG. 3 as an obstacle that should not be approached or traversed, wherein the user is given an opportunity to communicate to the robotic cleaning device 100 that it indeed may traverse the carpet 13 without the risk of getting stuck.

In a first step S201, the user captures an image 10 of the robotic cleaning device 100 using for instance a camera of her smart phone.

As can be seen in FIG. 3, the photo/visual representation 10 comprises, e.g., the robotic cleaning device 100, chairs 11, a table 12, a carpet 13, etc.

In a second step S202, the smart phone identifies the shape of the robotic cleaning device 100 in the image 10 as previously described.

Thereafter, in step S203, the smart phone computes the coordinate transform between a coordinate system of the image and a coordinate system of the robotic device 100. As a result, the coordinates of the coordinate system in which the robotic device moves can be translated to the coordinates of the image coordinate system.

Now, in step S204, the smart phone receives spatial information from the robotic cleaning device 100 via wireless communication, and applies in step S205 the computed transform to the received spatial information, wherein the received spatial information of the robotic cleaning device 100 is transformed to the coordinate system of the image 10.

Finally, in step S206, the transformed spatial information is presented in the captured image 10 on the display of the smart phone. As previously mentioned, the robotic cleaning device 100 may for instance add the contour of the carpet 13 to the image 10, indicating that it perceives the carpet as a non-traversable obstacle (which the user may given a chance to correct, as will be subsequently described).

Figure 6:
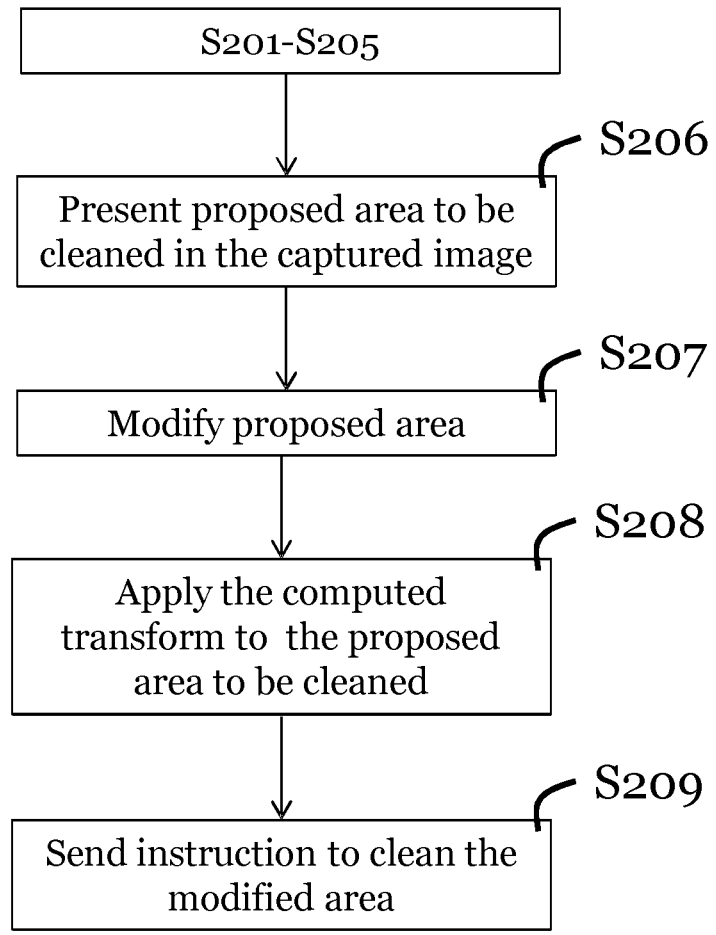
FIG. 6 shows a flowchart of a method according to yet another embodiment.

In another embodiment described again with reference to FIG. 3 and further to a flowchart of FIG. 6, the robotic cleaning device communicates a proposal of an area 14 to be cleaned (assuming that the same area 14 was not defined in the instruction sent from the user to the robotic device 100 in step S104 of FIG. 4). This embodiment is equally applicable to the respective method of FIGS. 4 and 5. As an example, the spatial information communicated from the robotic cleaning device 100 to the smart phone in step S204 of FIG. 5 may indeed comprise spatial information defining the area 14, as proposed by the robotic device 100.

Further, as is understood, the receiving of a proposed area 14 to be cleaned from the robotic cleaning device, may follow on the steps S101-S106 of the flowchart of FIG. 4.

Now, as already has been described throughout steps S201-S205 of FIG. 5, spatial information is received from the robotic cleaning device 100, in this particular exemplifying embodiment in the form of a proposed area 14 to be cleaned, which after having been transformed is presented in the captured image 10 on the display of the smart phone in step S206 fort the review of the user.

Now, in step S207, the user can either confirm that the proposed area 14 indeed is the area to be cleaned and send the confirmation as an instruction accordingly, or—as shown in FIG. 6—modify the proposed area 14, for instance by moving corner points of the rectangle encompassing the proposed area 14 in desired directions. It could further be envisaged that the user can add further corner points to the representation on the display by touching and pressing a line, whereby a new corner point will occur at a position where the line is pressed. The new corner point can then be moved to modify the rectangular-shaped area 14 to a pentagonal-shaped area.

Thereafter, in step S208, the previously computed transform is applied to the modified proposed area to be cleaned, wherein the modified proposed area is transformed to the coordinate system of the robotic cleaning device 100.

Thereafter, in step S209, the smart phone sends an instruction to the robotic cleaning device 100 to clean the modified area, the instruction also comprising the information identifying the transformed modified proposed area. Hence, the robotic cleaning device 100 may have proposed a rectangular-shaped area 14 to be cleaned, which the user modified into a pentagonal-shaped area that the robotic cleaning device 100 is instructed to clean instead of the originally proposed rectangular-shaped area 14.

Figure 7:
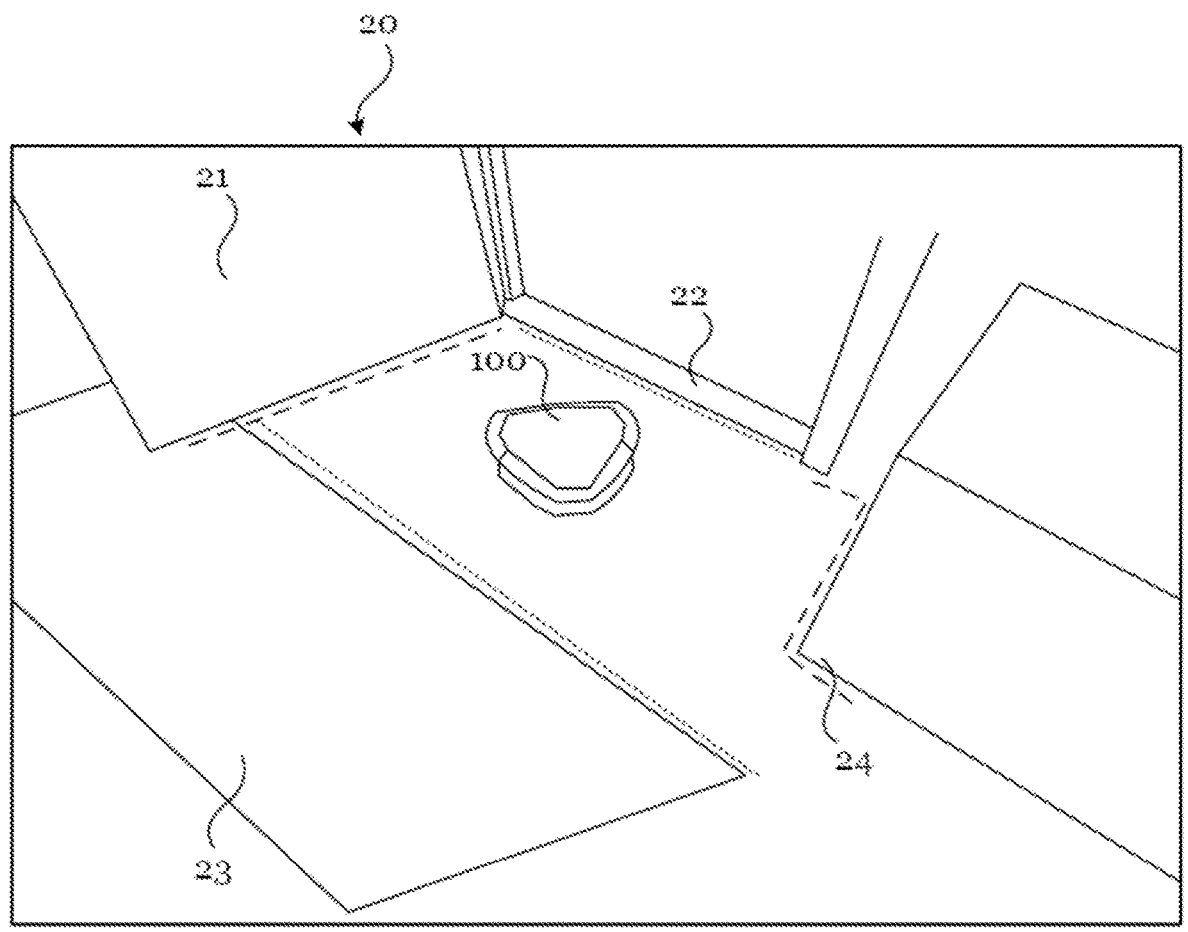
FIG. 7 shows an image taken of a robotic cleaning device where the robotic cleaning device has provided information in the image according to an embodiment.
Figure 8:
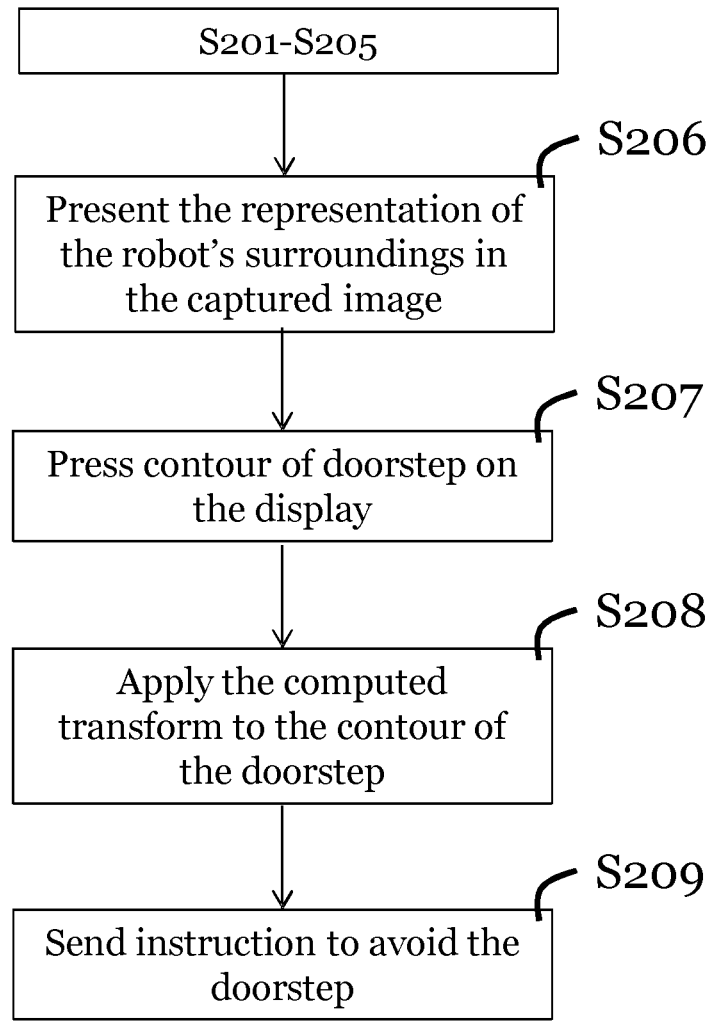
FIG. 8 shows a flowchart of a method according to a further embodiment.

FIG. 7 illustrates an image 20 taken of a robotic cleaning device 100 which together with a flowchart of FIG. 8 will be used for describing a further exemplifying embodiment of a method of sending spatial information from a robotic cleaning device to a user.

Again, as already has been described throughout steps S201-S205 of FIG. 5, spatial information is received from the robotic cleaning device 100, in this particular exemplifying embodiment in the form of contours of potential obstacles identified by the robotic cleaning deice 100, for instance a door 21, a doorstep 22, a thick carpet 23, a bureau 24, etc., which after having been transformed is presented in the captured image 20 on the display of the smart phone in step S206 for the review of the user.

Hence, in this particular exemplifying embodiment, the robotic cleaning device 100 transmits a representation of the surroundings of the robotic cleaning device 100 in step S204, which is present to the user in step S207. Such information can help a software developer to quickly understand if there are any systematic errors in how the robotic cleaning device 100 detects various categories of objects, and it can also explain to a user why the robotic cleaning device 100 cleans according to a particular pattern.

It can be noted that the procedure described above and in FIG. 7, could be performed repetitively on images in a video stream. The robotic cleaning device 100 could then move around and the user could maintain an updated view of what the robotic cleaning device 100 perceives.

By allowing a user to modify the received representation in step S207, the user can guide the robotic cleaning device 100 in its object detection (and thus navigation), in this particular example by pressing the contour of the doorstep 22 being present on the display to indicate to the robotic cleaner 100 that it is too high, and that the robotic cleaning device 100 should avoid attempting to traverse the doorstep 22, thereby avoiding getting stuck. This information may further be stored for later cleaning programs to be performed.

Thereafter, the computer transform is applied to the contour of the doorstep 22, such that its coordinates can be interpreted correctly by the robotic cleaning device 100.

In step S208, information defining the doorstep 22 in the coordinate system of the robotic cleaning device 100 is sent to the robotic device along with an instruction to avoid the doorstep 22.

Figure 9:
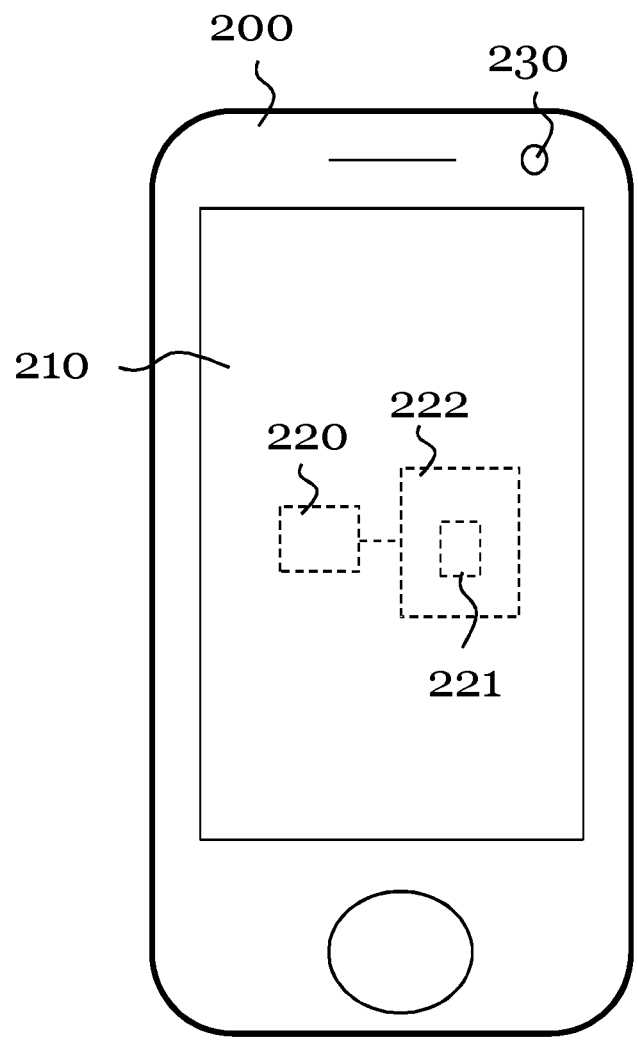
FIG. 9 illustrates a wireless communication device according to an embodiment.

FIG. 9 illustrates a wireless communication device 200 according to an embodiment. The wireless communication device 200 may be embodied in the form of a smart phone, a tablet, a smart watch, etc.

Actions performed by the wireless communication device 200 according to embodiments may be caused by a processing circuit 220 embodied in the form of one or more microprocessors arranged to execute a computer program 221 downloaded to a storage medium 222 associated with the microprocessor, such as a Random Access Memory (RAM), a Flash memory or a hard disk drive.

The processing circuit 220 is arranged to cause the wireless communication device 200 to carry out actions according to embodiments when the appropriate computer program 221 comprising computer-executable instructions is downloaded to the storage medium 222 and executed by the processing circuit 220. The storage medium 222 may also be a computer program product comprising the computer program 221. Alternatively, the computer program 221 may be transferred to the storage medium 220 by means of a suitable computer program product, such as a Digital Versatile Disc (DVD) or a memory stick. As a further alternative, the computer program 221 may be downloaded to the storage medium 222 over a network. The processing circuit 200 may alternatively be embodied in the form of a digital signal processor (DSP), an application specific integrated circuit (ASIC), a field-programmable gate array (FPGA), a complex programmable logic device (CPLD), etc.

Further, the wireless communication device 200 is equipped with a camera 230 (typically both on a front and back side of the wireless communication device), and a touch screen display 210 via which a user may enter information to the wireless communication device 200. The wireless communication device 200 is further configured with a wireless communication interface (not shown) via which signals are sent from, and received by, the wireless communication device 200.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of controlling movement of a robotic cleaning device over an area to be cleaned, the method comprising:

acquiring a visual representation of the robotic cleaning device on a display of a wireless communication device;

identifying the robotic cleaning device in the visual representation;

computing a coordinate transform between the visual representation and a robotic cleaning device coordinate system;

creating an instruction by receiving a user indication on the display of spatial information on how the robotic cleaning device should move over the area to be cleaned, the instruction indicating a user selected object identified in the visual representation and information on how the robotic cleaning device should move with respect to the user selected object;

applying the computed transform to the spatial information of the instruction, wherein the spatial information of the instruction is transformed to the robot coordinate system; and sending the instruction to the robotic cleaning device via wireless communication, wherein the robotic cleaning device moves over the area in accordance with the transformed spatial information of the instruction.

2. The method of claim 1, wherein the creating of the instruction comprises:

indicating, on the display, spatial information in the form of borders encompassing the area over which the robotic cleaning device should move.

3. The method of claim 1, wherein the acquiring of the visual representation comprises:

capturing an image of the robotic cleaning device with a camera of the wireless communication device.

4. The method of claim 1, wherein the acquiring of the visual representation comprises:

capturing an image of the robotic cleaning device with a camera of a device different from the wireless communication device, and transferring the image to the wireless communication device.

5. The method of claim 1, wherein the acquiring of the visual representation comprises:

capturing an image of the robotic cleaning device with a camera; and identifying the robotic cleaning device in the visual representation from a distinguishing feature enabling visual identification of the robotic cleaning device.

6. A method of acquiring spatial information of a robotic cleaning device, the method comprising:

acquiring a visual representation of the robotic cleaning device on a display of a wireless communication device;

identifying the robotic cleaning device in the visual representation;

computing a coordinate transform between the visual representation and a robotic cleaning device coordinate system;

receiving spatial information from the robotic cleaning device via wireless communication, applying the computed transform to the received spatial information, wherein the received spatial information is transformed to the coordinate system of the visual representation;

presenting the transformed spatial information in the acquired visual representation on the display of the wireless communication device; and creating an instruction indicating a user selected object identified in the visual representation and information on how the robotic cleaning device should move with respect to the user selected object.

7. The method of claim 6, further comprising:

allowing a user to confirm that the received spatial information presented on the display is correct; and sending a confirmation thereof to the robotic cleaning device.

8. The method of claim 7, wherein the received spatial information from the robotic cleaning device comprises a proposed area to be cleaned, and the method further comprises, upon receiving a confirmation from the user that the proposed area is correct, operating the robotic cleaning device to clean the proposed area and upon receiving a user modification of the proposed area, operating the robotic cleaning device to clean the modified proposed area.

9. The method of claim 6, wherein the step of creating an instruction comprises:

allowing a user to modify the presented transformed spatial information; and applying the computed transform to the modified spatial information, wherein the modified spatial information is transformed to the coordinate system of the robotic cleaning device; and sending the transformed modified spatial information to the robotic cleaning device via wireless communication.

10. The method of claim 6, wherein receiving the spatial information from the robotic cleaning device further comprises:

receiving a representation of surroundings of the robotic cleaning device as captured by the robotic cleaning device.

11. The method of claim 10, wherein the representation of the surroundings comprises an image captured by a camera of the robotic cleaning device.

12. A wireless communication device configured to control movement of a robotic cleaning device over an area to be cleaned, the wireless communication device comprising a processing unit being configured to cause the wireless communication device to be operative to:

acquire a visual representation of the robotic cleaning device on a display of the wireless communication device;

identify the robotic cleaning device in the visual representation;

compute a coordinate transform between the visual representation and a robotic cleaning device coordinate system;

create an instruction by allowing a user to indicate on the display spatial information on how the robotic cleaning device should move over the area to be cleaned, the instruction indicating a user selected object identified in the visual representation and information on how the robotic cleaning device should move with respect to the user selected object;

apply the computed transform to the spatial information of the instruction, wherein the spatial information of the instruction is transformed to the robot coordinate system;

send the instruction to the robotic cleaning device via wireless communication, wherein the robotic cleaning device moves over the area in accordance with the transformed spatial information of the instruction.

13. The wireless communication device of claim 12, further being operative to, when creating an instruction:
   indicate, on the display, spatial information in the form of borders encompassing the area over which the robotic cleaning device should move.

14. The wireless communication device of claim 12, further being operative to, when acquiring a visual representation:
   capture an image of the robotic cleaning device with a camera of the wireless communication device.

15. The wireless communication device of claim 12, further being operative to, when acquiring a visual representation:
   capture an image of the robotic cleaning device with a camera of a device different from the wireless communication device, the image being transferred to the wireless communication device (200).

16. The wireless communication device of claim 12, further being operative to, when acquiring a visual representation:
   capture an image of the robotic cleaning device; and
   identify the robotic cleaning device in the visual representation from a distinguishing feature enabling visual identification of the robotic cleaning device.

* * * * *